United States Patent [19]

Simjian

[11] 4,222,518

[45] Sep. 16, 1980

[54] METERING SYSTEM

[76] Inventor: Luther G. Simjian, Lago Mar Pl., 1750 S. Ocean La., Fort Lauderdale, Fla. 33316

[21] Appl. No.: 952,637

[22] Filed: Oct. 19, 1978

[51] Int. Cl.$^2$ .................... G06F 15/20; G06K 17/00; H04Q 3/00

[52] U.S. Cl. .................................. 235/375; 235/419; 340/147 R

[58] Field of Search ............................. 235/375, 419; 340/147 R, 152 R; 179/2 AM

[56] References Cited

U.S. PATENT DOCUMENTS

| | | | |
|---|---|---|---|
| 3,255,439 | 6/1966 | Simjian | 340/147 R |
| 3,501,744 | 3/1970 | Simjian | 340/152 R |

Primary Examiner—Daryl W. Cook

[57] ABSTRACT

A metering device, such as a postage meter, can be updated by a code bearing means which is provided with a first discernible code and a second obscured code, for instance, magnetic code. A computer stores a third code in association with the first code, however, the third code is correlated with the second code. Upon inserting the code bearing means in the metering device and obtaining the third code from the computer, the metering device is conditioned for updating responsive to said second code from the code bearing means and the third code from the computer being in predetermined correlation.

10 Claims, 4 Drawing Figures

4,222,518

METERING SYSTEM

BACKGROUND OF THE INVENTION

This invention concerns metering systems in which a meter upon being updated is conditioned for dispensing a predetermined sum or quantity of articles or is conditioned for dispensing postage stamps or imprinting validation stamps up to a predetermined sum of money. A typical specific example of such metering systems is the well known postage meter which from time to time needs to be recharged with a sum of money in order to dispense validation of variable amounts of money. When the supply of money or credit available is exhausted, the meter is blocked from further operation. The meter can be charged with a new sum of money prior to reaching its fully exhausted condition and, thus, remains operable while a sum of money, or credit, is available. Meters of the type described above are well known and some of the arrangements for meters include means for charging the meter without physically bringing the meter to the Post Office. The latter arrangements are shown, for example, in my U.S. Pat. Nos. 3,255,439 "Postage Metering System" dated June 7, 1966; 3,428,948 "Postage Metering System" dated Feb. 18, 1969; 3,501,744 "Postage Metering System Having Signal Conditioning Means" dated Mar. 17, 1970, and in the patent to McFiggins et al U.S. Pat. No. 3,792,446 "Remote Postage Meter Resetting Method" dated Feb. 12, 1974. Other pertinent art referring to the meter itself using combination locks or requiring predetermined numbers for recharging the meter will be found in U.S. Pat. Nos. 3,034,329 "Combination Lock Device" dated May 15, 1962 and 3,664,231 "Locking Device" dated May 23, 1972.

With respect to U.S. Pat. Nos. 3,664,231 and 3,792,446, the meter includes a storage tape having numbers to be used in predetermined sequence, the tape being stored in the meter and the user of the meter who is a subscriber to the service, is informed of a currently applicable number which correlates with the respective number on the tape. Responsive to the existence of correlation between the number set on the lock and the current number on the storage tape, the meter can be updated or recharged and the next successive number on the tape becomes applicable to the following recharging operation. The user is advised of the next number to be used for charging the meter.

The present invention omits the need for a storage tape in the meter and employs instead uniquely coded code bearing means in combination with a computer for updating the meter.

Other significant differences and advantages of the present invention over the prior art will be more clearly apparent from the description hereinafter.

SUMMARY OF THE INVENTION

In accordance with the present invention there is provided a code bearing means having a first code and a second code, and the metering device, such as a postage meter, is adapted to receive the code bearing means. A remote computing means includes a storage means for storing said first code and correlating such first code with a third code. Input means are adapted to provide said first code to said computing means whereupon said computing means provides said third code. Means associated with said metering device are adapted to sense said second code from said code bearing means and are adapted, further, to receive said third code and, responsive to said codes being in predetermined correlation, condition said metering device for updating. Additional means render the same combination of codes unusable responsive to conditioning of said metering device having occurred.

DETAILED DESCRIPTION OF THE INVENTION

Figure 1:
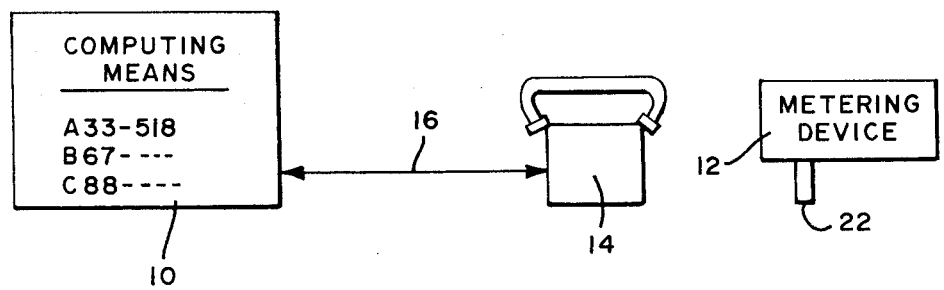
FIG. 1 is a schematic block diagram of the metering system forming the invention.

Referring now to the figures and FIG. 1 in particular, numeral 10 identifies a computing means which is located remote from a metering device 12, such as a postage meter or similar device. Also remote from the computing means 10 there is a transmitting means 14 which is connected to the computing means 10 by a suitable electrical transmitting line 16, for instance, a cable or a wireless connection. Most suitably, the transmitting means is a telephone with signal input means such as audio signals or electrical push buttons (push button telephone) which in response to an output from the computing means 10 provides the data provided by the computing means 10 in audio or visual form as is well known, for instance, in connection with stock market quotations, see U.S. Pat. No. 3,082,402 to J. R. Scantlin. The telephone 14 may be in proximity to the metering device 12, but it may also be remote from the metering device.

Figure 2:
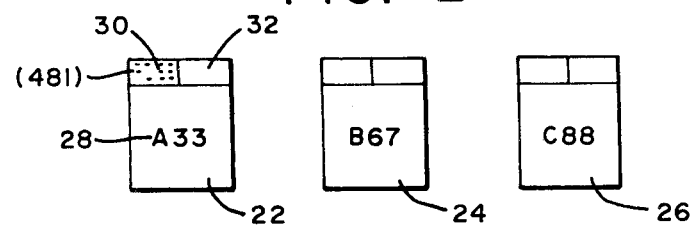
FIG. 2 is a schematic illustration of several code bearing means.

The metering device 12 is recharged or updated by the use of a code bearing means of the type illustrated in FIG. 2. In FIG. 2 three illustrative code bearing means 22, 24 and 26 are shown. Each code bearing means, typically a plastic card similar to a credit card, is provided with a first code 28 which is discernible to a person and for this reason such code may comprise printed characters "A33" as evident on the code bearing member. On members 24 and 26 the first code typically is "B67" and "C88" respectively.

Each code bearing member includes a second code which is obscured and therefore not readily discernible to the user of the system. To this end the second code may comprise magnetic characters disposed in a field 30. For the present example it is assumed that the second code of the code bearing member 22 comprises a three digit number "481". The corresponding second codes on the members 24 and 26 are distinct for each such member. Optionally, each member 22, 24 and 26 may include also a further code in field 32 which associates such code bearing member with a particular metering device 12 and, therefore, such further code may be considered a validation code which validates the use of a particular code bearing member with a respective predetermined metering device.

The computing means 10 has stored therein the first codes of the code bearing members which have been issued to a subscriber using the metering device 12. Thus, the computing means has stored therein the data "A33", "B67" and "C88" indicated on the code bearing members 22, 24 and 26. Associated with each first code data, the computing means also stores a plurality of third codes, each such third code data being correlated with the second code on the respective code bearing means. To clearly illustrate this correlation, it was assumed that member 22 has a first code "A33" and a second non-discernible code "481". The computing means 10 stores associated with "A33" a third code "518", the latter code being the nine completement numerals. Other correlations, of course, can be selected at the option of the designer of the system and the specific type of correlation is not pertinent to the invention.

Figure 3:
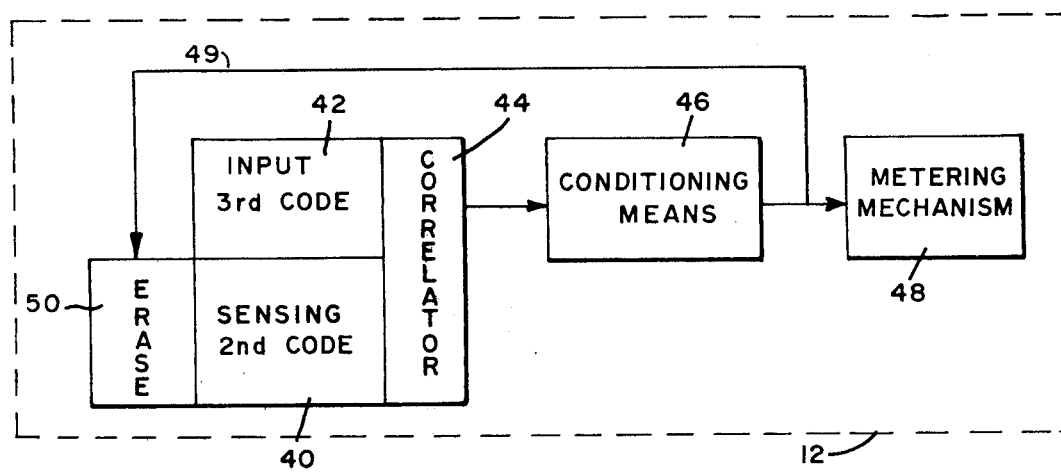
FIG. 3 is a schematic block diagram of portions forming the metering device.

Operation of the foregoing arrangement will be more clearly evident from the following description. In order to update metering device 12, the subscriber takes a code bearing member, such as member 22, and brings it into engagement with the metering device 12, see FIG. 1, for instance a slot in the metering device. As seen in FIG. 3, the metering device includes sensing means 40 for reading the magnetic code in field 30, i.e. the second code which is not discernible to the subscriber. The subscriber communicates the first code "A33" via the transmitting means 14 and 16 to the computer 10 whereupon the computer by the use of internal search means searches for "A33" and provides as output a signal corresponding to numerals "518" which is communicated via the transmitting means to the subscriber, he receiving this data as visual output or spoken words at the telephone 14. The metering device includes manual input means 42, push-buttons for instance, so that the subscriber now inputs the third code "518" provided by the computer 10. A correlator 44 associated with the metering device 12 establishes the existence of predetermined correlation between the second and third codes and responsive to the condition of correlation actuates conditioning means 46 which permit the metering mechanism 48 to be charged or updated. The conditioning means 46 may comprise means for the temporary coupling shafts within the meter charging mechanism, see U.S. Pat. No. 3,501,744. Responsive to the actuation of the conditioning mechanism 46 a signal is fed via conductor 49 to an erase means 50 which erases the code from the field 30 of the code bearing member 22 to render the code bearing member invalid for further use. Alternatively, other cancellation or voiding means may be used such as heat or cutting means.

Assuming that the predetermined condition of correlation is not attained the conditioning means 46 remains non-actuated and the metering mechanism 48 cannot be updated.

Alternatively, instead of erasing or voiding the second code on the code bearing member, erasing means associated with the computing means may be provided to erase, responsive to providing the third code, either the first code, the third code or both codes from the storage medium provided in the computing means, the principal object being to foil for the immediate future correlation between the first, second and third code data used in a preceding updating operation.

Figure 4:
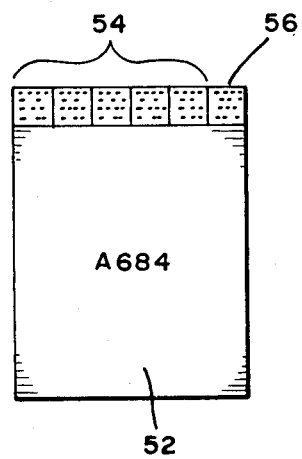
FIG. 4 is an alternative embodiment of the code bearing means shown in FIG. 2.

FIG. 4 illustrates schematically an alternative embodiment of the code bearing member. The member 52 includes a first code "A684", a plurality of second code fields 54 and a field 56 for the validation code. This particular member 52 is usable for a plurality of updating operations as governed by the quantity of fields provided. In this embodiment only a single field is erased responsive to each updating operation or, alternatively, only a particular third code in the computing means is erased since the first code must be preserved for additional updating operations.

In the foregoing system, the subscriber is provided with code bearing means for which a corresponding charge is made or, alternatively, the subscriber is invoiced responsive to updating operations as recorded by the computing means and evident by the issuance of third code data.

It will be apparent, moreover, that the second code and third code data need not to be different but may be identical, and correlation is achieved by matching the respective code data at the correlator 44.

The above description deals specifically with a postage metering device. It should be understood that the described arrangement is not limited to dispensing postage, but that the metering device will be found usable also for purposes other than that specifically illustrated and described.

While I have described and illustrated certain preferred embodiments of my invention, it will be apparent to those skilled in the art that various further changes and modifications may be made without departing from the broad principle of my invention which shall be limited only by the scope of the appended claims.

What is claimed is:

1. A metering system of the postage meter type or similar type comprising:
    a metering device adapted to receive a code bearing means provided with code data;
    input means coupled to said metering device for providing input data having a predetermined relation to the code data of said code bearing means;
    means associated with said metering device for sensing the code data of said code bearing means and said input data and in response to said code data of said code bearing means and said input data being in predetermined correlation causing said metering device to be conditioned for being updated, and
    cancelling means associated with said metering device for rendering the code bearing means entirely or partially unuseable for reuse responsive to said metering device having been updated.

2. A metering system as set forth in claim 1, said input means comprising manually operable means.

3. A metering system as set forth in claim 1, said code data comprising magnetic characters.

4. A metering system as set forth in claim 3, said cancelling means comprising code erasing means.

5. A metering system as set forth in claim 1, said means associated with said metering device acting upon a conditioning means responsive to said code of said code bearing means and said input data being in predetermined correlation.

6. A metering system as set forth in claim 5, said conditioning means including means to couple shafts to one another.

7. A metering system of the postage meter type or similar type comprising:
    a metering device adapted to receive a code bearing means;
    a code bearing means for use with said metering device provided with code data;
    manually operable input means coupled to said metering device for providing input data;
    correlating means coupled to said metering device and said input means for receiving said code data and said input data and responsive to said code data and input data being in predetermined correlation;

conditioning means coupled for being conditioned responsive to the existence of correlation and in response to being conditioned permitting said metering device to be updated to reflect an increased credit balance, and cancelling means coupled to said conditioning means for rendering said code bearing means entirely or partially unuseable for reuse responsive to said conditioning means having been actuated.

8. A metering system as set forth in claim 7, said cancelling means being magnetic code erasing or altering means.

9. A metering system as set forth in claim 7, said code data being contained in a predetermined field of said code bearing means.

10. A metering system as set forth in claim 7, said code bearing means being provided with additional code data for keying said code bearing means to a specific metering device.

* * * * *